(12) United States Patent
Aluvala et al.

(10) Patent No.: US 12,547,984 B2
(45) Date of Patent: Feb. 10, 2026

(54) METHODS FOR IMPROVED INTERORGANIZATIONAL COLLABORATION

(71) Applicant: Omnissa, LLC, Mountain View, CA (US)

(72) Inventors: Suman Aluvala, Bangalore (IN); Arjun Kochhar, Bangalore (IN); Pavan Rajkumar Rangain, Bangalore (IN); Mahesh Ashok Kavatage, Bangalore (IN)

(73) Assignee: Omnissa, LLC, Mountain View, CA (US)

( * ) Notice: Subject to any disclaimer, the term of this patent is extended or adjusted under 35 U.S.C. 154(b) by 175 days.

(21) Appl. No.: 17/078,121

(22) Filed: Oct. 23, 2020

(65) Prior Publication Data

US 2022/0027855 A1    Jan. 27, 2022

(30) Foreign Application Priority Data

Jul. 22, 2020  (IN) .............................. 202041031408

(51) Int. Cl.
| | | |
|---|---|---|
| G06Q 10/10 | (2023.01) | |
| G06F 16/9032 | (2019.01) | |
| G06F 16/907 | (2019.01) | |
| H04L 47/70 | (2022.01) | |
| H04L 51/02 | (2022.01) | |

(52) U.S. Cl.
CPC ..... *G06Q 10/103* (2013.01); *G06F 16/90332* (2019.01); *G06F 16/907* (2019.01); *H04L 47/828* (2013.01); *H04L 51/02* (2013.01)

(58) Field of Classification Search
CPC ............ G06Q 10/103; G06F 16/90332; G06F 16/907; H04L 47/828; H04L 51/02
See application file for complete search history.

(56) References Cited

U.S. PATENT DOCUMENTS

| | | | | |
|---|---|---|---|---|
| 9,317,574 | B1* | 4/2016 | Brisebois | G06F 16/951 |
| 11,010,810 | B1* | 5/2021 | Pylant | G16H 10/60 |
| 11,042,842 | B2* | 6/2021 | Hines | G06Q 10/103 |
| 2003/0004909 | A1* | 1/2003 | Chauhan | G06N 5/022 |
| | | | | 706/45 |
| 2006/0143159 | A1* | 6/2006 | Chowdhury | G06F 16/33 |
| | | | | 707/E17.061 |
| 2007/0174273 | A1* | 7/2007 | Jones | G06F 16/951 |
| | | | | 707/999.005 |

(Continued)

*Primary Examiner* — Rami R Okasha
(74) *Attorney, Agent, or Firm* — Kim & Stewart LLP

(57) ABSTRACT

Systems and methods are included for improved interorganizational collaboration. An agent on a server can crawl through data files to identify keywords relating to a product. The agent can create tags and assign the keywords to the tags. The agent can crawl through user-related data files to identify potential support users. The support users can be mapped to tags in a database. A user interacting with a chat application can request help with the product. The agent can extract keywords from the request and use them to identify a tag. The agent can map the tag to support users and using an algorithm can select a support user to send the help request to. If the support user denies the request or does not respond, the agent can send the request to another support user. Once a support user accepts the request, the agent can connect the users.

8 Claims, 6 Drawing Sheets

(56) References Cited

U.S. PATENT DOCUMENTS

| | | | | |
|---|---|---|---|---|
| 2008/0183759 A1* | 7/2008 | Dehlinger | ............. | G06F 16/382 |
| 2010/0070883 A1* | 3/2010 | Hamilton, II | .......... | G06N 5/022 |
| | | | | 709/202 |
| 2013/0007009 A1* | 1/2013 | Caldwell | ............... | G06F 16/337 |
| | | | | 707/E17.014 |
| 2014/0308648 A1* | 10/2014 | Jain | ......................... | G09B 7/02 |
| | | | | 434/362 |
| 2015/0269242 A1* | 9/2015 | Dey | .................... | G06Q 10/107 |
| | | | | 707/737 |
| 2016/0055249 A1* | 2/2016 | Fuji | ...................... | G06F 16/335 |
| | | | | 707/725 |
| 2016/0140186 A1* | 5/2016 | Langen | ................. | G06F 16/337 |
| | | | | 707/723 |
| 2017/0046397 A1* | 2/2017 | Watanabe | ............. | G06F 16/248 |
| 2018/0150571 A1* | 5/2018 | Douglas | .................. | H04L 51/52 |
| 2018/0268072 A1* | 9/2018 | Rathod | .................. | G06Q 50/01 |
| 2018/0349500 A1* | 12/2018 | Tremblay | ............. | G06F 16/9535 |
| 2021/0026859 A1* | 1/2021 | Vangala | .............. | G06F 16/9535 |
| 2021/0097097 A1* | 4/2021 | Alkan | ................. | G06F 16/3329 |
| 2021/0195030 A1* | 6/2021 | Braganza | .......... | G06F 16/90332 |
| 2021/0390144 A1* | 12/2021 | B M S | ................. | G06N 3/0445 |
| 2021/0406444 A1* | 12/2021 | Vontobel | .............. | G06Q 10/10 |
| 2022/0058562 A1* | 2/2022 | Swaminathan | ......... | G06F 40/40 |

\* cited by examiner

METHODS FOR IMPROVED INTERORGANIZATIONAL COLLABORATION

RELATED APPLICATIONS

Benefit is claimed under 35 U.S.C. 119(a)-(d) to Foreign Application Serial No. 202041031408 filed in India entitled "METHODS FOR IMPROVED INTERORGANIZATIONAL COLLABORATION", on Jul. 22, 2020, by VMware, Inc., which is herein incorporated in its entirety by reference for all purposes.

BACKGROUND

Many companies, especially large enterprises, are highly compartmentalized. Although this helps increase efficiency levels within each organizational group in the company, it makes communication and collaboration between groups exceedingly difficult. Current methods for facilitating interorganizational collaboration are full of obstacles that slow or impede attempts to connect to other groups.

As an example, some companies use a point of contact (POC) method where collaboration efforts often must go through an assigned POC. However, the POC can be unresponsive or too busy dealing with other things to respond in a timely manner. Collaboration requests can also get bottlenecked when a single person is responsible for processing requests.

In another example, some companies use a distribution list where a user from one group can send a message to all users of another group using a single address, such as a distribution email address. However, users on the distribution list will often assume someone else will respond or decide to leave it to someone else to deal with. These kinds of requests are often left unanswered for extended periods of time, sometimes indefinitely.

As a result, a need exists for facilitating interorganizational collaboration.

SUMMARY

Examples described herein include systems and methods for improved interorganizational collaboration. In one example, a support agent on a system server can crawl through system data files and identify keywords relating to products. The support agent can generate tags and map the keywords to the tags. The support agent can also crawl through user-related system data files and identify potential support users for the products. The support users can be mapped to tags based on various factors. For example, support users can be mapped to tags based on their product knowledge and expertise level. In an example, keywords, tags, and support users, as well as how they are mapped to each other, can be added, removed, or modified by an administrator.

In an example, a user interacting with a chatbot on a user device can request help on a product. The chatbot (also called a chat agent) can execute on the user device or execute as an application on a remote server, such as the system server. The chat agent on the user device can send the request to the support agent. In one example, the support agent can use natural language processing to interpret the request and identify keywords in it. The support agent can map the keywords to their assigned tags. The support agent can then map the tags to one or more support users.

In an example, the support agent can use a scheduling algorithm to select a first support user. The algorithm can help the support agent select a support user based on various factors, such as the availability and response rate of identified support users. In one example, the scheduling algorithm can load balance support volunteers to ensure no one person is overloaded. The scheduling algorithm can access volunteer calendars in an example, and select a volunteer based on near-term availability.

The support agent can send a notification to a first support device 130*a* of the first support user. In one example, the notification can be time bound. If the first user does not respond within the time allotted, the support agent can retract the notification and issue a notification to a second support device 130*b* of a second support user. In another example, the notification can be interactive and include buttons that allow a support user to accept or deny the request. If the first support user denies the request or does not respond in time, the support agent send the notification to a second support user. In one example, the support agent can continue this process until a support user accepts the request.

In an example, once a support user accepts a request, the support agent can connect the requesting user and the support user. As some examples, the support agent can send contact information of the support user to the requesting user, the support agent can schedule a meeting for the users, and the support agent can connect the users in a chat application.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Systems and methods are included for improved interorganizational collaboration. An agent on a server can crawl through data files to identify keywords relating to a product.

The agent can create tags and assign the keywords to the tags. The agent can crawl through user-related data files to identify potential support users for the product. The agent can assign the support users to the tags. A user interacting with a chatbot in a chat application can request help or collaboration with the product. The agent can extract keywords from the request and use them to identify a tag. The agent can map the tag to support users and, using an algorithm, can select a support user to send the help request to. If the support user denies the request or does not respond, the agent can retract the notification and send the request to another support user. The agent can continue notifying support users until one accepts. Once a support user accepts the request, the agent can connect the users.

Figure 1:
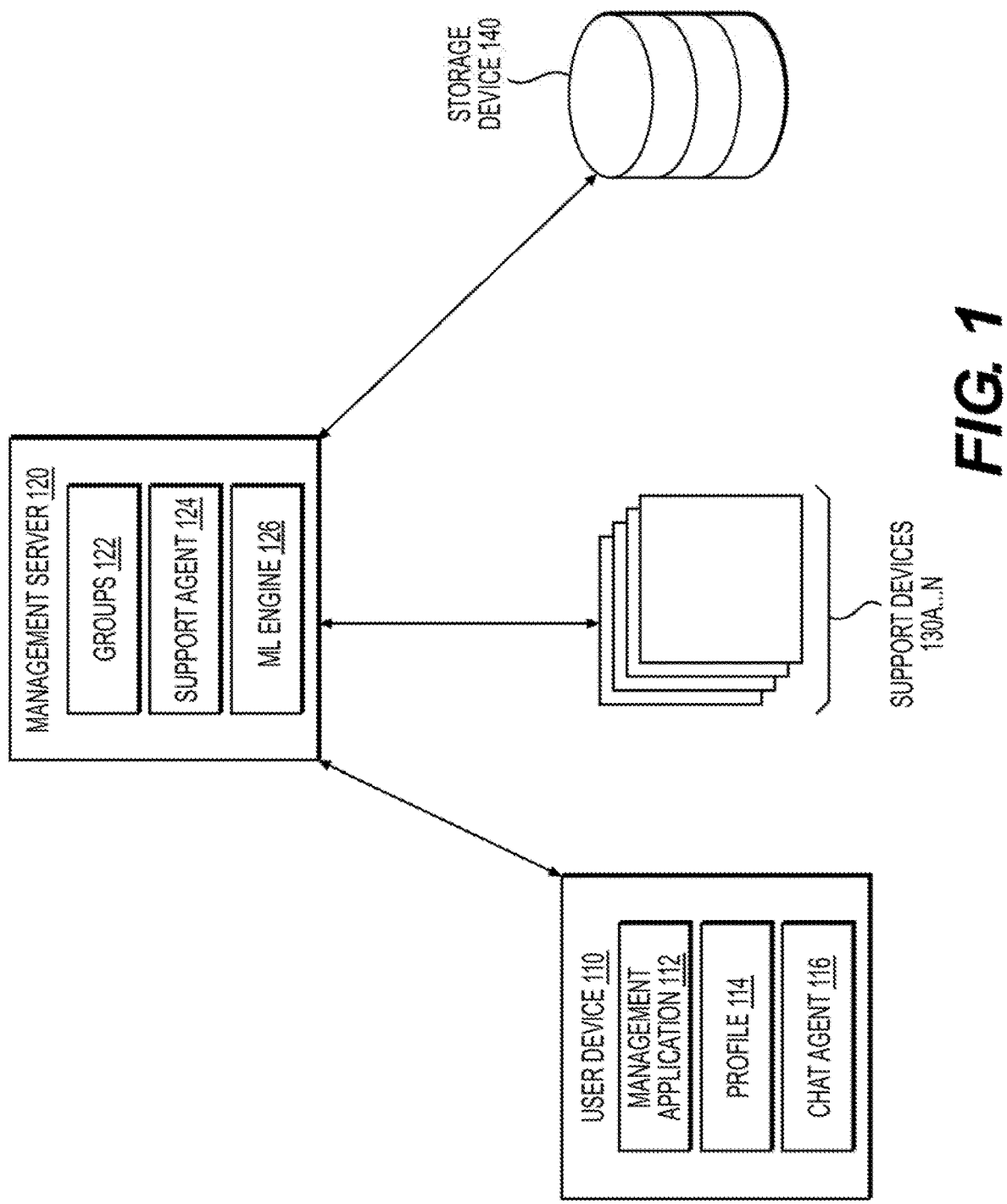
FIG. 1 is an illustration of an example system for performing improved interorganizational collaboration.

FIG. 1 is an illustration of a system for performing improved interorganizational collaboration. In an example, the system can include a user device 110, a management server 120, one or more support devices 130a . . . n, and a storage device 140. The user device 110 and support devices 130 can be one or more processor-based devices, such as a personal computer, tablet, or cell phone. Support devices 130 can be user devices that are associated with a support user, such as a help user or a subject matter expert. The management server 120 can be a single server or a group of servers, including multiple servers implemented virtually across multiple computing platforms. The storage device 140 can be one or more repositories for data storage, such as a database. In one example, the storage 140 can be included in the management server 120.

In an example, the management server 120 can be part of a unified endpoint management (UEM) system. The user device 110 can be enrolled in the UEM system and include a management application 112. The management application 112 can be a stand-alone application, part of an enterprise application, or part of an operating system of the user device 110. The management application 112 can be a part of the UEM system that manages and secures user devices that are enrolled with the enterprise. For example, the management application 112 can be responsible for ensuring that user devices are up to date with compliance and security settings prior to accessing UEM data and resources. The management application 112 can communicate with the management server 120, allowing UEM management of user devices 110 based on compliance and security settings at the management server 120. The management application 112 can enforce compliance at the user device 110, such as by wiping enterprise data when compliance standards are not met. Example compliance standards can include ensuring a device is not jailbroken, that particular encryption standards are used in enterprise data transmission, that the device does not have certain blacklisted applications installed or running, and that the device is located within a geofenced area when accessing certain enterprise resources.

The user device 110 can include a profile 114 of a user, and the profile 114 can indicate a group 122 with which the user is associated. The profile 114 and group 122 can allow the management server 120 to determine rules and access rights that should apply to the user device 110. In an example, the support devices 130 can be enrolled user devices that belong to other groups in the UEM. The profile can allow the management server to determine a support role (e.g., technical help or subject matter expert) for the user and which products or technologies that user is familiar with.

The management server 120 can include support agent 124 that is utilized to facilitate collaboration between users of different organizations or groups within an enterprise. To do this, the support agent 124 can crawl through data files in the storage device 140 related to products of the UEM and extract keywords. For example, the support agent 124 can utilize a natural language processing (NLP) to interpret manuals and other documentation of a product and determine keywords that apply to the product. The support agent 124 can create tags and then assign the keywords to the tags.

The support agent 124 can also crawl through service tickets and profile information to identify support users within the UEM. Support users can be users with elevated knowledge or experience on a particular product. The support agent 124 can map the support users to the tags according to their expertise. In one example, users in the UEM can assign themselves as support users for certain products. In another example, managers or administrators can assign users or groups to certain products. For example, a user can tag themselves as a help user for UEM and a subject matter expert for virtual identity management. When tags for the UEM are part of the help request, the user can be identified as a help user. When tags for virtual identity management (such as single sign on) are part of the help request, the user can be identified as an SME.

In an example, the user device 110 can execute a chat agent 116. In one example, the chat agent 116 can be part of the management application 112. A user can interact with the chat agent 116 to seek help from another user in the UEM. In one example, the chat agent 116 can include a chatbot interface that allows a user to communicate with the support agent 114 using natural language. For example, the chat agent 116 can send user text to the support agent 114, and the support agent 114 can use NLP to interpret the user text and generate automatic responses. In another example, some or all the NLP interpretation and automatic response generation can be performed by the chat agent 116. For example, the chat bot can use NLP to interpret a user's comments can provide responses. In some examples, the chat agent 116 can be integrated into a commercial chat application, such as SLACK, SKYPE-FOR-BUSINESS, and MICROSOFT TEAMS.

In some examples, the chat agent 116 can decipher user input to determine that a user is seeking assistance or coloration with another user in the UEM on a certain product. When this occurs, the chat agent 116 can use NLP to extract keywords from the request and map them to tags. In an example, the extracted keywords can indicate the product and type of help the user is seeking. In one example, the mapping can be performed by the support agent 124. The support agent 124 can map the tags to a support user previously identified for assisting with the product.

In some examples, the support agent 124 can identify multiple support users. In such instances, the support agent 124 can execute an algorithm to determine which support user to request help from. In one example, the support agent 124 can access a calendar of the support users and select one based on availability. The support agent 124 can be installed as part of enrollment in the UEM system and be given access to the calendar application on the user device of the support user. The calendar for the current day can be analyzed to determine whether the support user has near term availability, such as in the next hour. Additionally, the support agent 124 can analyze the percentage of the user's day that is already taken up with meetings having other attendees. If this percentage is above a threshold, such as 50 percent, the support agent 124 can deprioritize the support user in an attempt to not overburden that support user, who may already be operating on limited time for that day.

In an example, the support agent 124 can also apply a weight to different support users for ranking purposes based on who has responded the most in a time period, such as in the last week. Support users who have responded relatively less than others within a time period (e.g., a week) can be weighted higher such that no one user becomes overloaded. In another example, the support agent 124 can select a support user at random. Upon selecting a support user, the support agent 124 can send a notification of the collaboration request to the support device 130a of the support user.

In one example, the notification can be time bound. For example, if the support agent 124 does not receive a response within a certain time frame, the support agent 124 can withdraw the request and send the notification request to another support device 130b of another support user. In another example, the support agent 124 can notify a supervisor or administrator of the support user if a request is not responded to in the allotted time frame. Such examples can help ensure that the user's request is answered in a timely manner.

In an instance where the support user accepts the collaboration request, the support agent 124 can connect the user and the support user. As some examples, connecting the users can include exchanging contact information, setting up a private chat room, and setting up a meeting time on both users' calendars.

In one example, the management server 120 can include a machine learning service (ML engine) 126. The support agent 124 can utilize the ML engine 126 to perform certain functions, such as using NLP to extract keywords, creating and applying tags, and locating support users. In an example, the ML engine 126 can be trained to apply a machine learning algorithm to the storage device 140 to create models for applying collaboration tags. The ML engine 126 can be trained to adjust tags based on certain events. For example, if a support user declines a collaboration request the notification can request a reason for declining. In an instance where multiple users belonging to a certain group decline similar notifications and state that they are not capable of providing the requested assistance, the ML engine 126 can reanalyze the tags and support users to identify another group that may be more suited to send that type of request.

Figure 2:
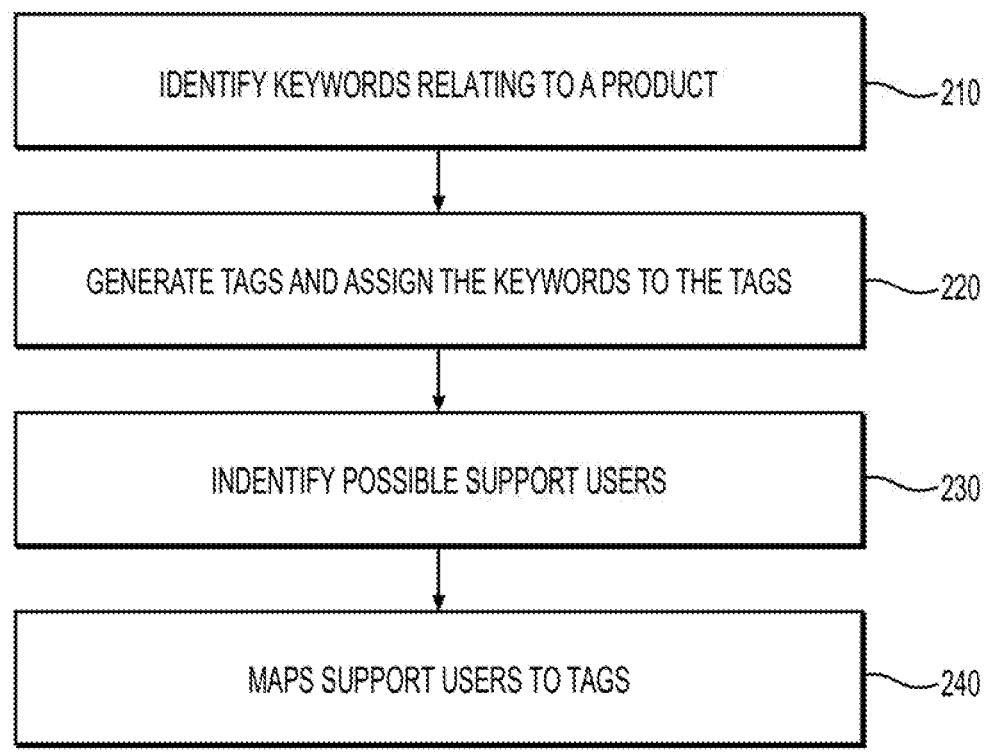
FIG. 2 is a flowchart of an example method for improved interorganizational collaboration.
Figure 3:
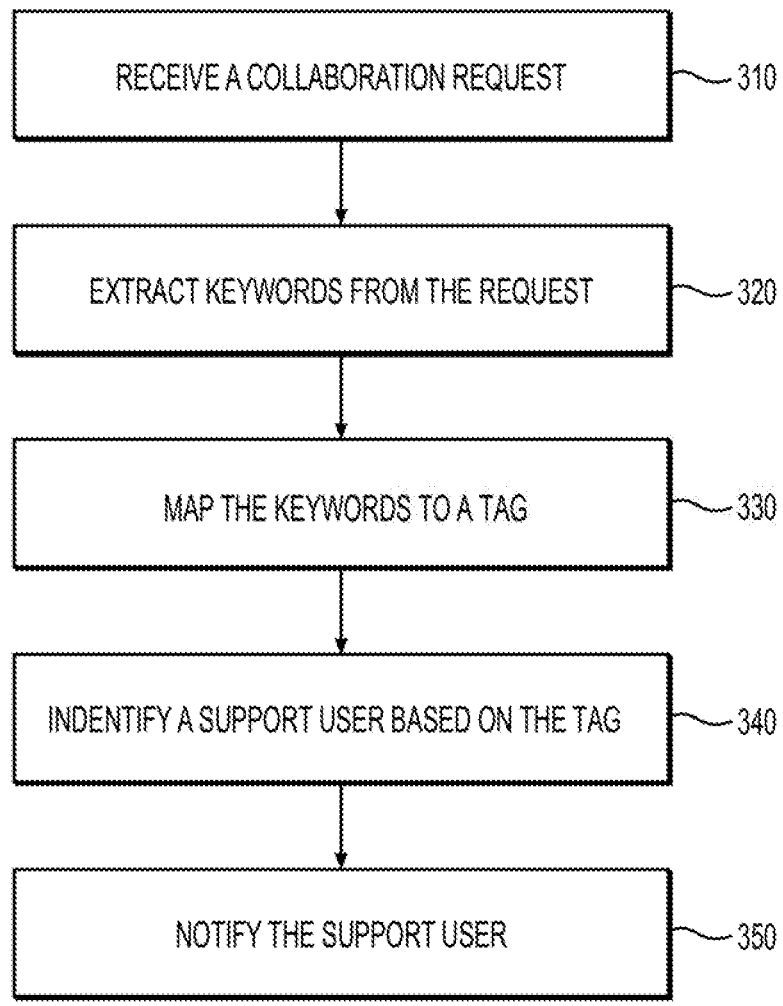
FIG. 3 is another flowchart of an example method for improved interorganizational collaboration.

FIGS. 2 and 3 illustrate example methods for improved interorganizational collaboration. FIG. 2 illustrates an example method for background processes that the management server 120 can execute to configure a UEM to receive and process collaboration requests. FIG. 3 illustrates an example method for receiving and processing such collaboration requests.

Moving to FIG. 2, at stage 210, the support agent 124 can identify keywords relating to a product. In an example, this can include crawling through data files relating to a product and using NLP to analyze and understand text in the files. Some examples of product data files can include documentation, manuals, and application files. The data files can be stored on the storage device 140 in an example.

At stage 220, the support agent 124 can generate tags and assign the keywords to the tags. The tags can help organize the keywords so the support agent 124 can more correctly map collaboration requests to the correct support user. As an example, the tags can indicate a level of expertise required for a support user to provide adequate assistance. For example, the tags can have a "Help" level for basic support, such as setup or technical support, and a "Subject Matter Expert" (SME) level for advanced support, such as product integration and design changes.

In one example, the support agent 124 can use a template to created tags. The template can include fields for certain types of information. An example of a tag template can read <product>-<support level>. As an example, "IDM-help" can be a tag for basic support of an identity manager (IDM), and "IDM-SME" can be a tag for advanced support of the IDM. These are, of course, merely examples of tag naming conventions, and naming conventions for tags can be customized as desired.

At stage 230, the support agent 124 can identify possible support users. This can include crawling through relevant user data to determine the expertise level of users in the system. For example, the support agent 124 can crawl through service tickets and profile data, including groups 122 that a user belongs to. The support agent 124 can use this information to determine which users can provide support for which products. When the support agent 124 identifies a support user for a product, it can categorize the support user according to the user's expertise level. As an example, users that can help with more advanced needs like implementing cross-product integrations can be identified as SME support users for the products they work on, whereas users that can only provide general product knowledge or help with in setup can be identified as help users. In one example, the products and expertise of a support user can be identified at least in part by the user's ID or any group IDs the user is assigned to.

At stage 240, the support agent 124 can map support users to tags. This can include mapping the support user's profile to the tag. In one example, users in an enterprise can tag themselves for certain products. For example, the management application 112 can include a GUI feature that allows a user to review any tags that his or her profile is mapped to. The GUI can allow users to search for and add themselves to tags. In another example, the GUI can allow the user to remove themselves from tags, such as tags that have been incorrectly applied to their profile by the support agent 124. In another example, supervisors or administrators can add users to tags. In one example, an administrator can add or remove groups of users to tags using group IDs.

In an example of the previously described method, the support agent 124 crawls through data files of an enterprise email application. The support agent 124 identifies various keywords that may be used by users seeking help or collaboration. Some examples of the keywords include "email," "login," "integration," "SAML" (for Security Assertion Markup Language), "Kerberos," "tokens," and "SSO" (for Secure Sign-On). The support agent 124 generates tags using a template of <product>-<category>-<level>. The support agent 124 creates the tag "email-authentication-help" for basic authentication matters and "email-authentication-sme" for advanced authentication matters. Keywords similar to "login" are assigned to "email-authentication-help," and keywords similar to "Kerberos, "tokens," and "SSO" are assigned to "email-authentication-sme." The support agent 124 uses a similar structure for other categories, such as "integration" and "AP." The support agent 124 then crawls through service tickets and user profile information to identify support users for the email application and maps the tags to the appropriate support users based on the category and expertise level. The support agent 124 also receives manual tag mapping to support users from an administrator.

In an example, keywords, tags, and support users, as well as how they are mapped to each other, can be added, removed, or modified by an administrator. For example, administrator profiles of the UEM can have access to a user interface that allows them to view and modify the mappings. The administrator can add or remove individual users or user group from tags. For example, an administrator can add or remove user groups using group IDs. In an example, an administrator can also create or modify keywords and tags.

Moving to FIG. 3, at stage 310, the support agent 124 can receive a collaboration request. In an example, the request can be received through the chat agent 116. In an example, the chat agent 116 can be a chatbot. A chatbot can be an application that conducts an on-line chat conversation with users by using artificial intelligence software to understand what a user is saying using NLP and provide automated responses. In an example, the user can enter text into the chat agent 116 requesting help or collaboration with an enterprise product. The support agent 124 can use NLP to determine what product the user wants help with and what type of help is needed. If the chat agent 124 cannot identify the product or the type of help needed, the chat agent 124 can be programmed to automatically respond to the user with prompts that will help it figure out what the user needs.

At stage 320, the support agent 124 can extract keywords from the request. The keyword extraction can occur after determining that a user has requested help, or as part of the request determination. In an example, the support agent 124 can check words in the request against previously stored keywords, such as those identified in stage 210. For example, at stages 210 and 220, the support agent 124 can store the keywords and tags in relational data tables. The support agent 124 can then use the keyword data table to determine what words in the request correspond to keywords.

At stage 330, the support agent 124 can map the keywords to a tag. As an example, support agent 124 agent can determine which tags the extracted keywords were assigned to in stage 220. In one example, this can be done the using relational data tables previously discussed. The support agent 124 can include mechanisms for handling incidents where the extracted keywords map to multiple tags. In one example, the support agent 124 can select the tag that has the most keywords mapped to it. In another example, the support agent 124 can respond to the user in the chat agent 116 requesting additional information. As an example, if the support agent 124 determines a product that a user needs help with but the extracted keywords map to both helps users and SME users, the support agent 124 can send a response to the user requesting information that will elicit additional keywords to help identify which tag should apply. For example, the support agent 124 can provide a list of help items that the user can choose from, and each item can map to a certain tag.

At stage 340, the support agent 124 can identify a support user based on the tags. In one example, this can include continuing the mapping from stage 330 to identify a support user mapped to the tags. In some examples, the support agent 124 can identify multiple support users. For example, a tag can map to a group 122. Any user that is a part of the group 122 mapped to the tag can be identified as a support user.

In some examples where the support agent 124 identifies multiple support users, the support agent 124 can be configured to select one support user based on certain criteria. In one example, the support agent 124 can access the calendars of the support users and eliminate any support users that may have a scheduling conflict. For example, if the support user's calendar is booked for the next two hours, they can be eliminated. Alternatively, if a threshold percentage of their workday is already booked with meetings having other attendees, such as 50 percent of their time between 8 AM and 6 PM, then they can be eliminated.

In a second example, the support agent 124 can review the request acceptance rate of eligible support users and select an available support user with the highest acceptance rate. The high acceptance rate can be weighted based on how recently the support user accepted a help request. The weighting can attempt to prioritize support users that have helped relatively less compared to the other qualifying support users, which can prevent support burnout. For example, a first support user with a 70 percent acceptance rate can be weighted down based on having already helped a user today, whereas a support user with a 60 percent acceptance rate can be prioritized based on not having volunteered in the last three days.

In a third example, the support agent 124 can select the support user at random from the available support users. The random selection can be done in a type of round-robin format. For example, the support agent 124 can keep track of which support users have accepted help requests, and those users can be removed from the pool of available support users until all or most other support users for the product have accepted a help request unless no other support user is currently available. This can help load-balance help requests for groups of support users.

In one example, the support agent 124 may need more information from the user to be able to identify a support user. In such an example, the support agent 124 can be configured to ask the user certain questions in the chatbot to get the necessary information. As an example, a user can ask for help with a UEM email application in the chatbot. The support agent 124 can determine that the user is requesting help with the email application, but keywords from the request may map to multiple tags that in turn map to different types of support users. For example, some keywords can map to multiple tags, and additional keywords may be required to identify the correct tag. The support agent 124 can ask the user for more details about the type of help needed with the email application. In one example, the support agent 124 can provide a list of keywords for the user to choose from. The support agent 124 can continue prompting the user until it obtains enough keywords to identify a single tag.

At stage 350, the support agent 124 can notify the support user. In an example, this can include sending a notification to the support device 130 corresponding to the support user's profile. The notification can display on the support device 130, asking the support user if he or she can provide the requested help. The notification can be an interactive notification that allows the support user to accept or deny the request.

In one example, the notification can be time bound. For example, the notification can be set to expire after a predetermined amount of time. If the support user does not respond within the time allotted the support agent 124 can retract the notification and send it to another support user. For example, at stage 340 the support agent 124 can create a list of users according to the criteria. Eligible support users can be ranked based on one or more of the above approaches. When a first choice declines or does not respond, a next-ranked support user can be notified. The support agent 124 can start by notifying the first support user, and if the first support user declines or does not respond in time, then the support agent 124 can continue down the list until a support user accepts.

In an example, after a support user accepts a request, the support agent 124 can connect the user and the support user. For example, the support agent 124 can schedule a meeting for the users, share contact information, or connect the users on an enterprise communication platform, such as email or a chat application.

In an example of the previously described method, a user needs help integrating SSO into an enterprise email application. The user uses the chatbot of the chat agent 116 to ask for help. The support agent 124 uses NLP to extract the keywords "email," "SSO," and "integrate" from the request. The support agent 124 then determines that this combination of keywords maps to the tag SSO-integrate-SME. The support agent then maps the tag to a group of SME level support users for SSO integration. The support agent 124 uses an algorithm to create an ordered list of the users that excludes any such support users that are known to be unavailable. The support agent 124 sends a notification for the collaboration request to the first support user in the ordered list, who denies the request. The support agent 124 then sends a notification to the second support user on the list. The second support user does not respond in the time allotted. The support agent 124 then retracts the request notification and sends a request notification to a third support user on the list. The third support user accepts the request, so the support agent 124 connects the two users on a communication medium, such as a private chat platform.

In one example, the support agent 124 can apply machine learning models in some stages of the methods described in FIGS. 2 and 3. For example, the support agent 124 can apply machine learning at least to identify keywords, generate tags, identify possible support users. After completing a user's help request, the ML engine 126 can train the model so that the support users can be more correctly and efficiently identified. As an example, where a support user denies a help notification, the notification can ask the support users to provide a reason why. The ML engine 126 can use the response to retrain the model. For example, if the support user indicates that he or she does not support the product, the ML engine 126 can remove the user from the tag. Similarly, if numerous support users from the same group provide the same response, the ML engine 126 can determine that either the keywords or the support users should be remapped for the tag. These are merely examples, and there are numerous ways that an ML engine can retrain a model to correct and optimize the collaboration mapping.

Figure 4:
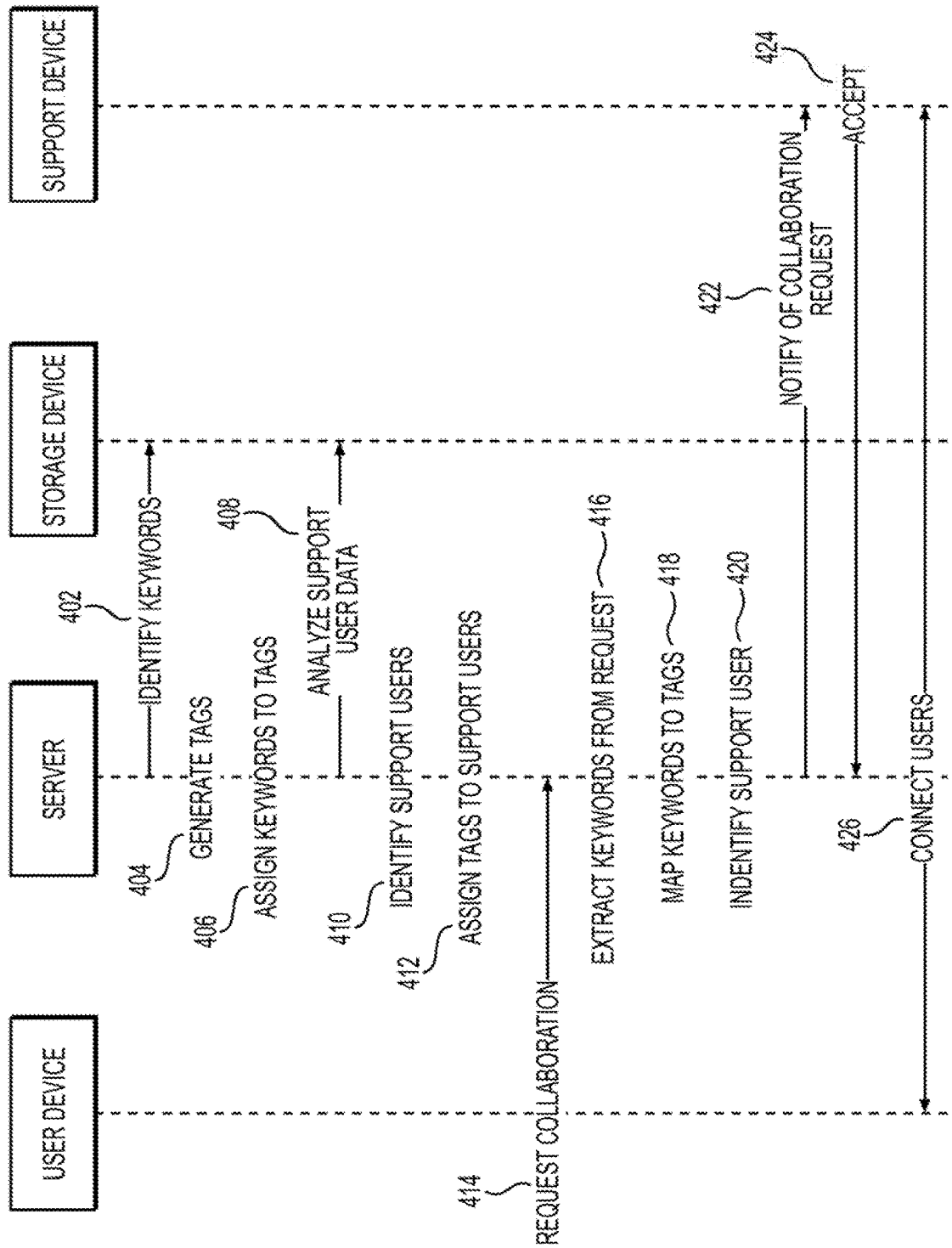
FIG. 4 is a sequence diagram of an example method for improved interorganizational collaboration.

FIG. 4 is a sequence diagram of an example method for improved interorganizational collaboration. At stage 402, the management server 120 can crawl through data files in the storage device 140 to identify keywords related to a product. For example, the management server 120 can use NLP to analyze and understand text in the files, such as documentation, manuals, and application files.

At stage 404, the management server 120 can generate tags. The tags can be structured to help the management server 120 identify appropriate support users. As an example, a tag can indicate the product, the type of help needed, and the support level needed. In one example, the tag can have a template, such as <product>-<category>-<level>. In another example, tags can be created or modified by an administrator.

At stage 406, the management server 120 can assign the keywords to the tags. In an example, one keywords can be assigned to multiple tags, and likewise different keywords can be assigned to the same tag. The assignments can allow the management server 120 to identify a tag based on input from a user seeking help or collaboration.

At stage 408, the management server 120 can analyze support user data. This can include crawling through relevant user data to determine the expertise level of users in the UEM. For example, the support agent 124 can crawl through service tickets and profile data, including groups 122 that a user belongs to. At stage 410, the management server 120 can identify possible support users. The support agent 124 can use this information to determine which users can provide support for which products. When the support agent 124 identifies a support user for a product, it can categorize the support user according to the user's expertise level.

When the management server 120 identifies a support user that matches the criteria for a tag, the management server 120 can assign the tag to the support user at stage 412. This can include mapping the support user's profile to the tag. This can allow the management server 120 to send a help request notification to all support devices 130 associated with the support user's profile. In one example, users can add themselves to tags. For example, the management application 112 can include a GUI feature that allows users to add or remove tags they are assigned to. In another example, supervisors or administrators can add users to tags. This can include adding or removing groups of users using group IDs.

At stage 414, a user can request collaboration on the product from the user device 110. In an example, the user can make the request using the chat agent 116. For example, the chat agent 116 can be a chatbot, and the user can enter text into the chat agent 116 requesting help or collaboration with an enterprise product. The support agent 124 can interpret the user request using NLP, as an example, to determine that the user is requesting help.

At stage 416, the management server 120 extract keywords from the request. In an example, the management server 120 can check words in the request against previously stored keywords, such as those identified in stage 402. For example, at stages 402 and 404, the management server 120 can store the keywords and tags in relational data tables. The management server 120 can then extract any words in the user's request that are in the data tables.

At stage 418, the management server 120 can map the keywords from the request to the tags. As an example, the management server 120 agent can determine which tags the extracted keywords were assigned to in stage 404. In one example, this can be done the using relational data tables previously discussed.

At stage 420, the management server 120 can identify a support user using the tags. In one example, this can include continuing the mapping from stage 330 to identify a support user mapped to the tags. In some examples, the management server 120 can identify multiple support users. As one example, a tag can map to a group 122. Any user that is a part of the group 122 can be identified as a support user.

In some examples where the support agent 124 identifies multiple support users, the management server 120 can be configured to select one support user using a set of rules. In one example, the management server 120 can access the calendars of the support users and eliminate any suitable support users that may have a scheduling conflict. In a second example, the management server 120 can review the request acceptance rate of the support users and select an available support user with the highest acceptance rate. In a third example, the management server 120 can select the support user at random from the available support users.

At stage 422, the management server 120 can send a notification of the collaboration request to the support device 130 of the support user. In one example, the notification can ask the support user if he or she can provide the requested help. In another example, the notification can be an interactive notification that includes buttons allowing the support user to accept or deny the request.

At stage 424, the support user can accept the collaboration request on the support device 130. As an example, the notification can include an interface with an accept and a reject button, and the support user can select the accept button. Upon accepting the request, the support device 130 can notify the management server 120.

At stage 426, the management server 120 can connect the user and support user. For example, the support agent 124 can schedule a meeting for the users, share contact information, or connect the users on an enterprise communication platform, such as email or a chat application.

Figure 5:
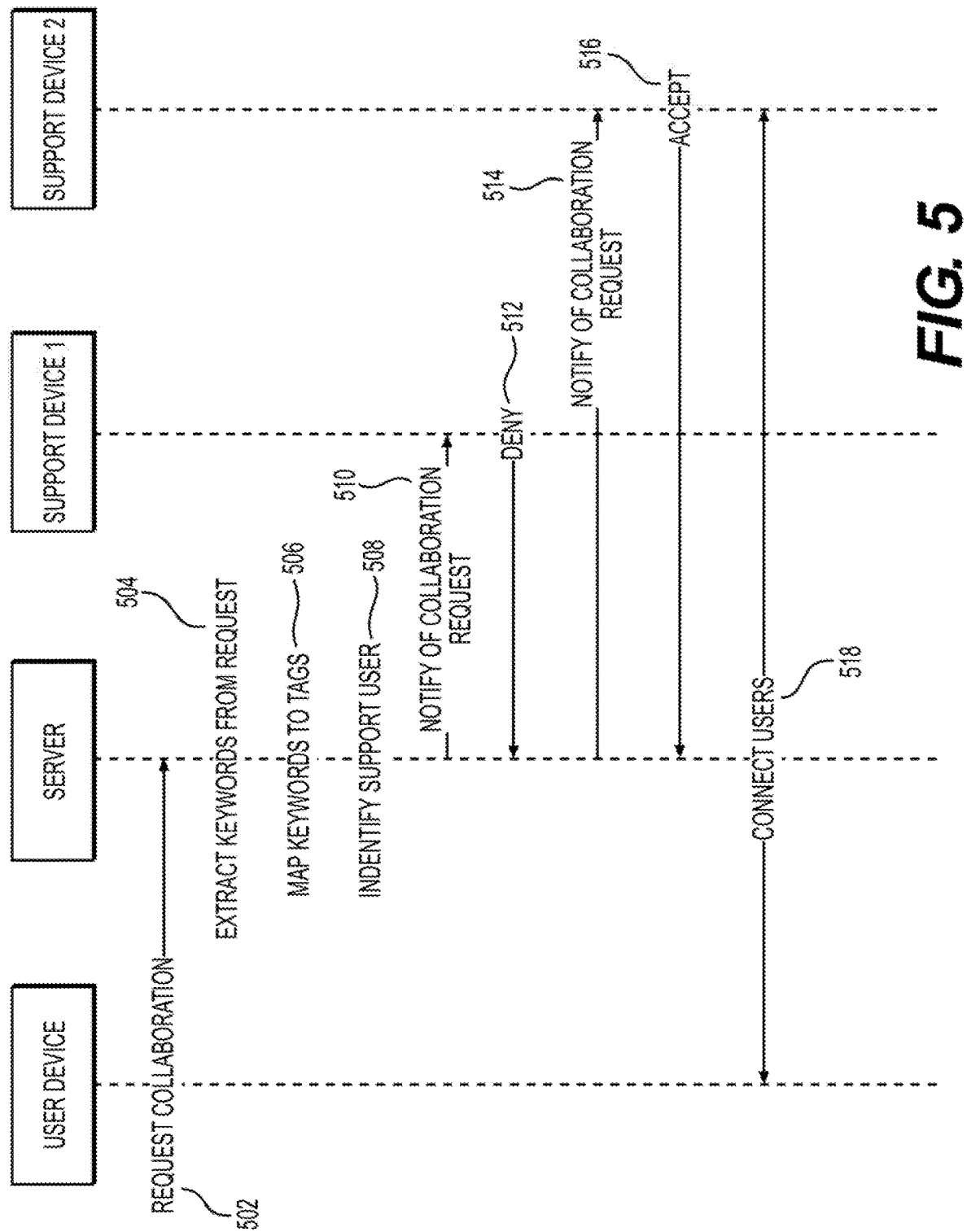
FIG. 5 is another sequence diagram of an example method for improved interorganizational collaboration.

FIG. 5 is another sequence diagram of an example method for improved interorganizational collaboration where at least one support user denies a help request. At stage 502, a user can request collaboration on the product from the user device 110. In an example, the user can make the request using the chat agent 116. For example, the chat agent 116 can be a chatbot, and the user can enter text into the chat agent 116 requesting help or collaboration with an enterprise product. The support agent 124 can interpret the user request using NLP, as an example, to determine that the user is requesting help.

At stage 504, the management server 120 extract keywords from the request. In an example, the management server 120 can check words in the request against previously stored keywords, such as those identified in stage 402. For example, at stages 402 and 404, the management server 120 can store the keywords and tags in relational data tables. The management server 120 can then extract any words in the user's request that are in the data tables.

At stage 506, the management server 120 can map the keywords from the request to the tags. As an example, the management server 120 agent can determine which tags the extracted keywords were assigned to in stage 404. In one example, this can be done the using relational data tables previously discussed.

At stage 508, the management server 120 can identify multiple support users using the tags. In one example, this can include continuing the mapping from stage 330 to identify a support user mapped to the tags. In one example, a tag can map to a group 122. Any user that is a part of the group 122 can be identified as a support user.

The management server 120 can be configured to select a first support user from the multiple support users to send a help request notification. In one example, the management server 120 can access the calendars of the support users and eliminate any suitable support users that may have a scheduling conflict. In a second example, the management server 120 can review the request acceptance rate of the support users and select an available support user with the highest acceptance rate. In a third example, the management server 120 can select the support user at random from the available support users.

At stage 510, the management server 120 can send a notification of the collaboration request to the first support device 130a of the first support user. In one example, the notification can ask the support user if he or she can provide the requested help. In another example, the notification can be an interactive notification that includes buttons allowing the support user to accept or deny the request.

At stage 512, the support user can deny the collaboration request on the first support device 130a. As an example, the notification can include an interface with an accept and a reject button, and the support user can select the reject button. Upon denying the request, the support device 130a can notify the management server 120. In one example, the notification can be time bound. For example, the notification can be set to expire after a predetermined amount of time. If the first support user does not respond with the time allotted, then the management server 120 can retract the notification and send it to another support user.

At stage 514, the management server 120 can send a notification of the collaboration request to the second support device 130b of a second support user. At stage 516, the second support user can accept the collaboration request on the second support device 130b. For example, where the notification includes buttons for accepting or denying the request, the user can select to accept. Upon accepting the request, the support device 130b can notify the management server 120.

At stage 518, the management server 120 can connect the user and second support user. For example, the support agent 124 can schedule a meeting for the users, share contact information, or connect the users on an enterprise communication platform, such as email or a chat application.

Figure 6:
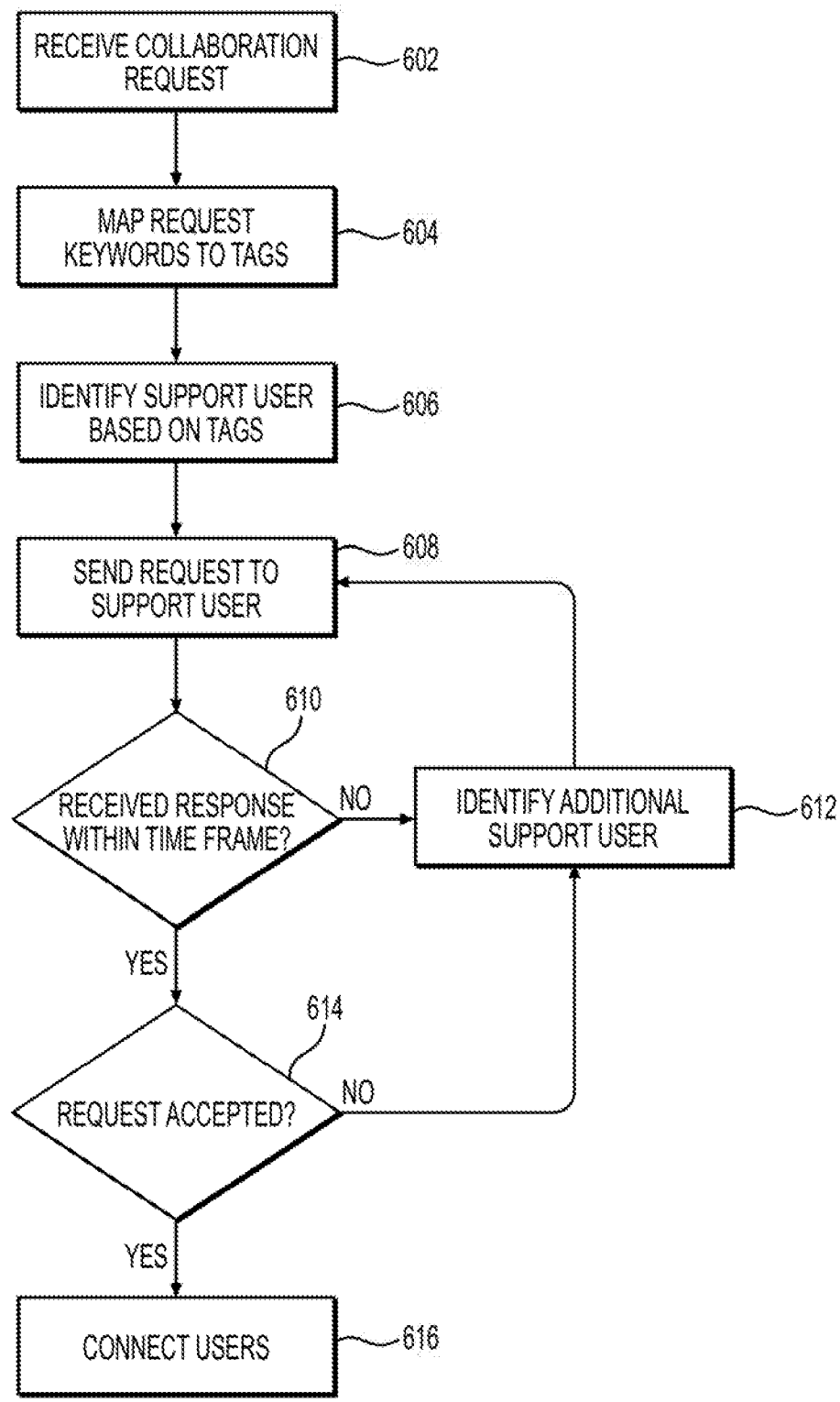
FIG. 6 is another flowchart of an example method for improved interorganizational collaboration.

FIG. 6 is a flowchart of an example method executed by the support agent 124 when receiving a support request. At stage 602, the management server 120 can receive a collaboration request. In an example, the request can be received through the chat agent 116. For example, the chat agent 116 can be a chatbot, and a user can enter text into the chat agent 116 requesting help or collaboration with an enterprise product. The support agent 124 can interpret the user request using NLP, in an example.

At stage 604, the support agent 124 can map keywords in the request to tags. In an example, the support agent 124 can compare the user's request to a list or table of keywords previously created. Such a list or table can be created using the method described in FIG. 2, as an example. The support agent 124 can map the keywords their assigned keywords. In some examples, the support agent 124 may need additional information to identify a support user at stage 606 below. As an example, keywords can be mapped to multiple tags. The support agent 124 can use combinations of keywords to sufficiently narrow down the tags so that the support agent 124 can identify a single group of support users. Accordingly, the support agent 124 may require additional keywords to sufficiently narrow the applicable tags so that the correct support users can be identified. In such an instance, the support agent 124 can instruct the chat agent 116 to prompt the user for additional information.

At stage 606, the support agent 124 can identify a support user based on the tags. In one example, this can include mapping the tags to support users or groups. In some examples, the support agent 124 can identify multiple support users. For example, a tag can map to a group 122. Any user that is a part of the group 122 mapped to the tag can be identified as a support user.

The management server 120 can be configured to select a first support user from the multiple support users to send a help request notification. In one example, the management server 120 can access the calendars of the support users and eliminate any suitable support users that may have a scheduling conflict. In a second example, the management server 120 can review the request acceptance rate of the support users and select an available support user with the highest acceptance rate. In a third example, the management server 120 can select the support user at random from the available support users.

At stage 608, the support agent 124 can send the collaboration request to the support user. In one example, the notification can ask the support user if he or she can provide the requested help. In another example, the notification can be an interactive notification that includes buttons allowing the support user to accept or deny the request.

At stage 610, the support agent 124 can determine whether it receives a response within an allotted time frame. For example, the notification can be time bound and set to expire after a predetermined amount of time. If the support user does not respond with the time allotted, then the support agent 124 can retract the notification and proceed to stage 612, where the support agent 124 can identify another support user. The support agent 124 can then return to stage 608 and send the notification to the second support.

In one example, the support agent 124 can create a list of support users at stage 606, and the support agent 124 can proceed to notify the next support user on the list. In another example, the method can return to stage 606 where the support agent 124 can re-identify support users. This may be necessary where the support agent 124 uses user calendars to identify support users. After a time-bound notification has lapsed, the schedules may no longer be current. Therefore, the support agent 124 can return to stage 606 a reanalyze the support user calendars to determine which support users are now available.

If a response is received within the allotted time frame, at stage 614 the support agent 124 can determine whether the support user accepted or denied the collaboration request. In an instance where the support user denied the collaboration request, the method can proceed to stage 612 where the support agent 124 can identify an additional user.

In an instance where the support user accepts the collaboration request, the method can proceed to stage 616 where the support agent 124 can connect the user and the support user. For example, the support agent 124 can schedule a meeting for the users, share contact information, or connect the users on an enterprise communication platform, such as email or a chat application.

Other examples of the disclosure will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method of improving interorganizational collaboration through a management server of a device management system that is in communication with a plurality of user devices that are enrolled in the device management system, wherein the plurality of user devices include end user devices and support user devices, comprising:
    crawling through data files in a storage device related to products of the device management system and extracting keywords that apply to the products;
    creating tags, assigning the keywords to the tags, and storing the tags and the keywords in association with each other in a relational data table;
    crawling through user profile information of support users and mapping the support users to the tags according to expertise levels of the support users;
    receiving a collaboration request from a first user device that is one of the end user devices enrolled in the device management system, wherein the collaboration request is generated by an application running in the first user device based on inputs made on the first user device;
    extracting at least one keyword from the request;
    determining one of the tags in the relational data table that is associated with the at least one keyword from the request;
    identifying an ordered group of support users that are mapped to the one tag, wherein the group of support users is ordered based on a ranking function that applies a higher weight to support users that have responded less frequently within a specified time period, wherein identifying the ordered group of support users comprises:
        retrieving calendar data from support user devices corresponding to the support users,
        determining for each user a percentage of a designated workday that has previously been reserved for meetings, and
        deprioritizing a subset of the support users for whom the percentage is above a predetermined threshold;
    selecting a first support user from the ordered group of support users, wherein the first support user is assigned a highest weight based on the ranking function;
    sending a time-bound notification of the collaboration request to a second user device, wherein the second user device is one of the support user devices corresponding to the selected first support user, wherein the time-bound notification expires after a predetermined time if the time-bound notification is not responded to by the selected first support user;
    determining that the time-bound notification has expired;
    selecting a second support user from the ordered group of support users, wherein the second support user is assigned a second highest weight based on the ranking function; and
    sending a second time-bound notification to a third user device corresponding to the second support user,
    wherein, in an instance where the collaboration request is accepted by the third user device, a private online communication is established between the first user device and the third user device.

2. The method of claim 1, wherein the at least one keyword is extracted by comparing text in the collaboration request to the previously extracted keywords that apply to the products of the device management system.

3. The method of claim 1, wherein the application is a chatbot application and the at least one keyword is extracted from text entered into the chatbot application by an end user of the first user device.

4. A non-transitory, computer-readable medium containing instructions for execution by a hardware-based processor of a management server of a device management system that is in communication with a plurality of user devices that are enrolled in the device management system, wherein the plurality of user devices include end user devices and support user devices, and the instructions, when executed by the hardware-based processor, performs stages for improved interorganizational collaboration, the stages comprising:
    crawling through data files in a storage device related to products of the device management system and extracting keywords that apply to the products;
    creating tags, assigning the keywords to the tags, and storing the tags and the keywords in association with each other in a relational data table;

crawling through user profile information of support users and mapping the support users to the tags according to expertise levels of the support users;
receiving a collaboration request from a first user device that is one of the end user devices enrolled in the device management system, wherein the collaboration request is generated by an application running in the first user device based on inputs made on the first user device;
extracting at least one keyword from the request;
determining one of the tags in the relational data table that is associated with the at least one keyword from the request;
identifying an ordered group of support users that are mapped to the one tag, wherein the group of support users is ordered based on a ranking function that applies a higher weight to support users that have responded less frequently within a specified time period, wherein identifying the ordered group of support users comprises:
  retrieving calendar data from support user devices corresponding to the support users,
  determining for each user a percentage of a designated workday that has previously been reserved for meetings, and
  deprioritizing a subset of the support users for whom the percentage is above a predetermined threshold;
selecting a first support user from the ordered group of support users, wherein the first support user is assigned a highest weight based on the ranking function;
sending a time-bound notification of the collaboration request to a second user device, wherein the second user device is one of the support user devices corresponding to the selected first support user, wherein the time-bound notification expires after a predetermined time if the time-bound notification is not responded to by the selected first support user;
determining that the time-bound notification has expired;
selecting a second support user from the ordered group of support users, wherein the second support user is assigned a second highest weight based on the ranking function; and
sending a second time-bound notification to a third user device corresponding to the second support user,
wherein, in an instance where the collaboration request is accepted by the third user device, a private online communication is established between the first user device and the third user device.

5. The non-transitory, computer-readable medium of claim 4, wherein the at least one keyword is extracted by comparing text in the collaboration request to the previously extracted keywords that apply to the products of the device management system.

6. The non-transitory, computer-readable medium of claim 4, wherein the application is a chatbot application and the at least one keyword is extracted from text entered into the chatbot application by an end user of the first user device.

7. A system for improving interorganizational collaboration through a management server of a device management system that is in communication with a plurality of user devices that are enrolled in the device management system, wherein the plurality of user devices include end user devices and support user devices, the management server comprising:
a memory storage including a non-transitory, computer-readable medium comprising instructions; and
a hardware-based processor that executes the instructions to carry out stages comprising:
  crawling through data files in a storage device related to products of the device management system and extracting keywords that apply to the products;
  creating tags, assigning the keywords to the tags, and storing the tags and the keywords in association with each other in a relational data table;
  crawling through user profile information of support users and mapping the support users to the tags according to expertise levels of the support users;
  receiving a collaboration request from a first user device that is one of the end user devices enrolled in the device management system, wherein the collaboration request is generated by an application running in the first user device based on inputs made on the first user device;
  extracting at least one keyword from the request;
  determining one of the tags in the relational data table that is associated with the at least one keyword from the request;
  identifying an ordered group of support users that are mapped to the one tag, wherein the group of support users is ordered based on a ranking function that applies a higher weight to support users that have responded less frequently within a specified time period, wherein identifying the ordered group of support users comprises:
    retrieving calendar data from support user devices corresponding to the support users,
    determining for each user a percentage of a designated workday that has previously been reserved for meetings, and
    deprioritizing a subset of the support users for whom the percentage is above a predetermined threshold;
  selecting a first support user from the ordered group of support users, wherein the first support user is assigned a highest weight based on the ranking function;
  sending a time-bound notification of the collaboration request to a second user device, wherein the second user device is one of the support user devices corresponding to the selected first support user, wherein the time-bound notification expires after a predetermined time if the time-bound notification is not responded to by the selected first support user;
  determining that the time-bound notification has expired;
  selecting a second support user from the ordered group of support users, wherein the second support user is assigned a second highest weight based on the ranking function; and
  sending a second time-bound notification to a third user device corresponding to the second support user,
  wherein, in an instance where the collaboration request is accepted by the third user device, a private online communication is established between the first user device and the third user device.

8. The system of claim 7, wherein the at least one keyword is extracted by comparing text in the collaboration request to the previously extracted keywords that apply to the products of the device management system.

* * * * *